Dec. 11, 1934.  W. C. BAILEY  1,983,832
APPARATUS FOR DEHYDRATING OIL AND WATER EMULSIONS
Filed Sept. 8, 1931  2 Sheets-Sheet 2
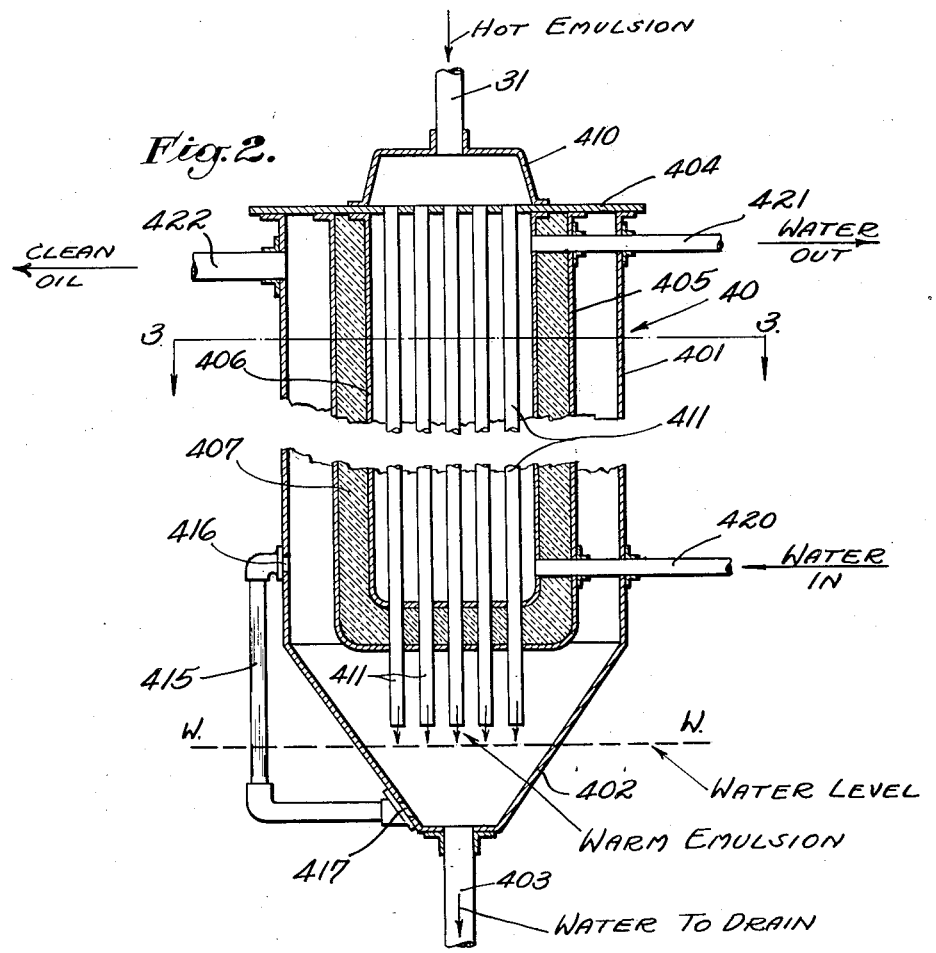
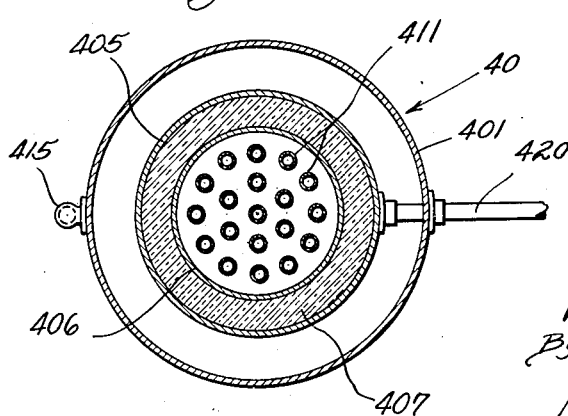

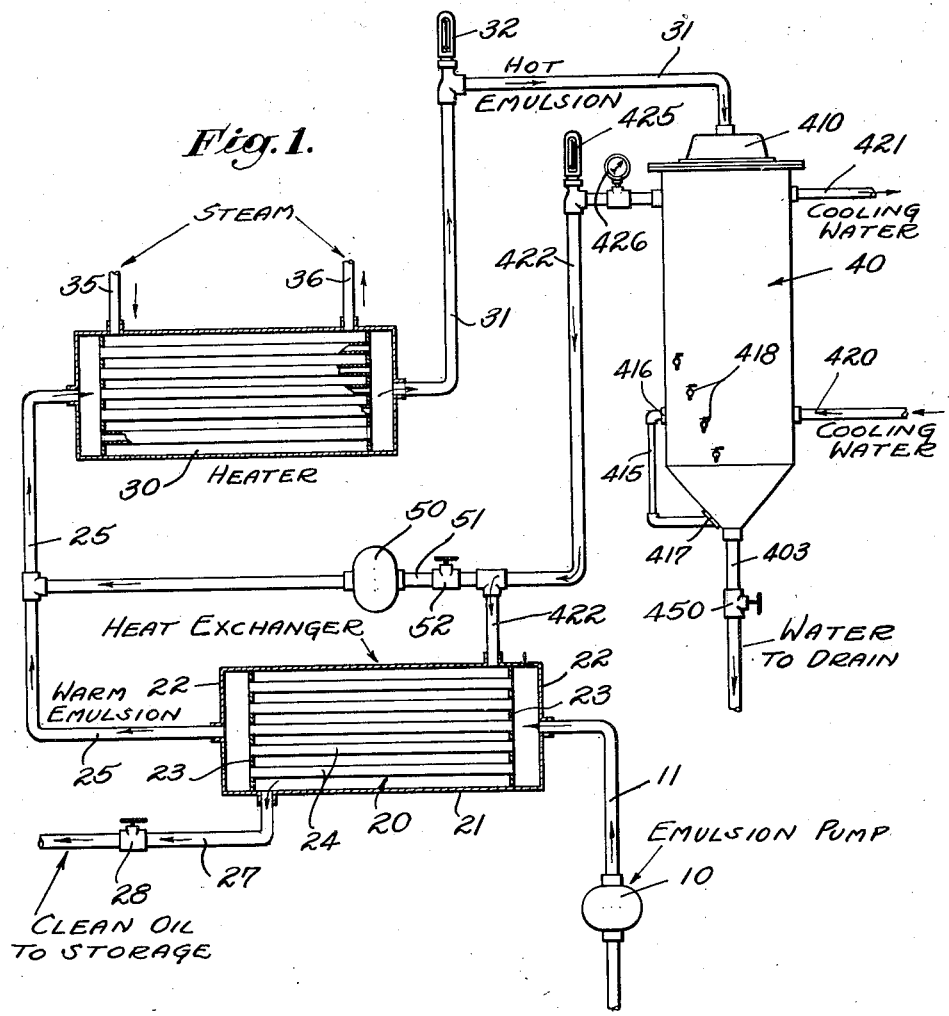

Patented Dec. 11, 1934

1,983,832

UNITED STATES PATENT OFFICE 1,983,832

APPARATUS FOR DEHYDRATING OIL AND WATER EMULSIONS

Walter C. Bailey, Norwalk, Calif.

Application September 8, 1931, Serial No. 561,637

6 Claims. (Cl. 196—5)

My invention relates to the art of separating or dehydrating emulsions of oil and water and is particularly applicable to the dehydration of petroleum emulsions, and is an improvement upon my abandoned application Serial No. 154,297, filed December 11, 1926, entitled Process of dehydrating emulsions. In the production of oil or during some of the manufacturing processes to which petroleum oil is subjected in the petroleum industry emulsions of oil and water are formed. These emulsions are ordinarily of water-in-oil type, that is to say, the water is present in the body of the oil in the form of small drops or particles. If the water drops are sufficiently large they readily settle out under the influence of gravity, but emulsions are often produced in which the water particles are so small that they remain suspended in the oil for long periods. Various methods have been devised for causing the water to separate from the oil and many patents have been issued directed to the separation, particularly by electrical means. I have discovered that petroleum emulsions of the water-in-oil type can be readily separated without the use of electric stresses.

It is an object of my invention to provide a process of and apparatus for causing such a separation.

Further objects and advantages will be made evident hereinafter.

Referring to the drawings which are for illustrative purposes only,

Fig. 1 is a diagrammatic representation of a complete plant adapted to be used in the dehydration of petroleum emulsions.

Fig. 2 is a section through the cooler used in my invention taken on a vertical plane, and Fig. 3 is a section through the cooler taken on a horizontal plane indicated by the line 3—3 of Fig. 2.

In the practice of my invention I use an emulsion pump 10, a heat exchanger 20, a heater 30, a cooler 40, and a circulating pump 50, this apparatus being connected by various pipes as shown diagrammatically in Fig. 1. The pump 10 may be of any desired form and draws untreated emulsion from any convenient source (not shown) and feeds the emulsion to the heat exchanger 20 through a pipe 11. The heat exchanger may also be of any convenient form, that shown comprising a cylindrical shell 21 having ends 22 and intermediate heads 23 between which tubes 24 are connected. The emulsion from the pump enters one end of the heat exchanger 20 through the pipe 11, passing to the space in the end of the heat exchanger between the end 22 and the head 23, and flowing through the tubes 24 to the other end of the heat exchanger from which it is withdrawn through a pipe 25 which delivers it to the heater 30. The heater 30 is of similar construction to the heat exchanger 20, the emulsion from the heat exchanger passing into one end of the heater and through tubes therein to the other end of the heater from which it is taken through a pipe 31 and delivered to the top of the cooler 40. A thermometer 32 may be placed in the pipe 31 for the purpose of recording the temperature of the emulsion passing therethrough. The space inside the heater 30 surrounding the tubes contains steam admitted by a pipe 35 and withdrawn through a pipe 36.

The cooler 40 shown in Figs. 2 and 3 consists of a cylindrical shell 401 having a coned bottom 402 into which a water and sediment outlet pipe 403 is connected. A top 404 is secured in gas-tight relationship to the shell 401 and secured to the top is an outer shell 405 and an inner shell 406, the space between these shells being preferably filled with heat insulating material 407. This heat insulating material may be any of the well-known magnesium pipe covering compounds, mineral wool, or other material which transmits heat slowly. Secured above and to the top 404 is a bell 410 into which the pipe 31 connects, and connected into the top 404 and extending downwardly therefrom is a plurality of tubes 411, these tubes being welded or otherwise secured in gas-tight relationship in the top 404 and the shells 405 and 406. The tubes preferably project a short distance below the bottom of the shell 405 into the space inside the conical bottom 402 of the shell 401. A gauge glass 415 is provided, this glass being connected into the shell at points 416 and 417, the purpose of the gauge being to indicate the water level in the cooler. Small pet-cocks 418, shown in Fig. 1, may also be disposed about the outside of the cooler for the purpose of allowing the water level to be tested from time to time. The space inside the shell 406 around the tubes 411 is supplied with cooling water through a pipe 420, the water being withdrawn through a pipe 421. An oil outlet pipe 422 connects into the side of the shell 401 near the top thereof and conducts warm clean oil from the top of the cooler to the space between the heads 23 and around the tubes 24 of the heat exchanger 20. A thermometer 425 and a gauge 426 may be provided in the pipe 422 for the purpose of indicating the temperature and pressure of the warm clean oil leaving the cooler. The pump 50 may be of any desired form and is used as a by-pass pump drawing oil through a pipe 51 and a valve 52 from the pipe 422 and delivering it into the pipe 25. Clean oil may be withdrawn from the space between the heads 23 in the heat exchanger 20 by means of a pipe 27 through a valve 28.

The method of operation of my invention is as follows:

The emulsion to be treated is forced through the pipe 11 by the pump 10 and through the tubes 24 in the heat exchanger 20. These tubes are surrounded with warm clean oil and the emulsion is pre-heated in the tubes 24. The purpose of the heat exchanger is to conserve heat and provide for economical operation of the apparatus. The warm emulsion is delivered through the pipe 25 into the heater 30. The emulsion passing through the tubes in this heater is preferably heated by steam admitted to the space around the tubes through the pipe 35 and withdrawn through the pipe 36. In the heater 30 the emulsion is heated to a point somewhat below the boiling point of water. The hot emulsion from the heater 30 is delivered through the pipe 31 into the space below the bell 410 of the cooler 40 and is forced downwardly through the tubes 411. These tubes are surrounded with cold water and a very rapid cooling of the hot emulsion takes place in the tubes.

In practice I prefer to cool the oil as it passes through the tubes to a temperature which is considerably above atmospheric temperature. If, for example, the hot emulsion is at a temperature of 210° F. operating on certain oils, I cool the emulsion only 20° F. or to 190° F. so that it leaves the tubes 411 at the lower end of the cooler at a temperature of 190° F. I maintain a body of warm water in the bottom of the cooler, this level being indicated by the line W—W in Fig. 2. The height of the water can be readily determined by the gauge glass 415, water being withdrawn at a more or less continuous rate by manipulation of a valve 450 in the water outlet pipe 403. In practice I may provide automatic means for maintaining the water level W—W, but this level can be readily maintained after the plant has been operated for a short time by a suitable manipulation of the valve 450 so that water is withdrawn continuously at the rate at which it is separated from the oil. The size of the tubes 411 is such that the oil attains considerable velocity in passing downwardly therethrough, and upon leaving the tubes it impinges upon the body of water in the bottom of the cooler. The water level is preferably maintained at about the level of the lower ends of the tubes 411.

I have found by the actual operation of a pilot plant that there is either a coalescence of water particles in the tubes 411 or the body of water in the bottom of the cooler acts in some manner to catch and retain the water particles in the emulsion, allowing the oil which has been freed from water to rise through the space between the shells 401 and 405. The purpose of the heat insulation 407 is to conserve cooling water and prevent cooling of the clean warm oil by the water. This clean warm oil is taken off through the tube 422 and delivered to the space around the tubes 24 in the heat exchanger where it gives up a considerable portion of its heat to the incoming emulsion, the clean oil being withdrawn from the heat exchanger through the pipe 27 and passed to storage. If it is desired to increase the velocity of the oil in the tubes 411, this can be done by using the pump 50 which recirculates a part of the cleaned oil through the heater and cooler, the amount of oil so circulated being regulated partially by the use of the valve 52.

I have found that by the use of my apparatus a very satisfactory dehydration of oil can be accomplished. Since a large portion of the heat applied to the emulsion is recovered in the heat exchanger 20, the process is very economical.

While I have shown a particular form of heater for producing "hot emulsion", it is to be understood that the form shown is merely a convenient form and the hot emulsion may be readily produced by other means.

The heat interchanger is introduced to promote economy and is quite important, since by recovering a considerable proportion of the heat from the warm clean oil and transferring it to emulsion the amount of heating necessary in the heater is only that necessary to supply the heat losses in the apparatus and that carried away by the clean oil and water. If the amount of water in the emulsion is large, the warm water from the separator can also be passed through a heat interchanger (not shown) and a portion of this heat transferred to the cold emulsion. The downward flow of the emulsion through the separator seems to be desirable. During its passage through the tubes of the separator the emulsion is not only cooled but acquires a velocity which carries it downwardly into the water in the bottom of the separator after it leaves the tubes of the separator. I am of the opinion that some sort of a differential velocity action takes place as the emulsion leaves the tubes, the water continuing to move downwardly and becoming mixed with the water already there and the oil being first checked in its downward action and then floated upwardly.

I prefer to operate my apparatus at substantially atmospheric pressure in which event the hot emulsion flowing into the top of the separator should be at a temperature below 212° F. (100° C.), the boiling point of water. If the temperature is raised above this point at atmospheric pressure, a portion of the water is converted into steam which is undesirable.

By partially closing the valve 28 in the clean oil outlet pipe 27, the pump 10 in the emulsion inlet pipe can build up a pressure on the emulsion and oil and the temperature of the hot emulsion may be raised without generating steam and, when viscous oils are being treated, this may be very desirable. The degree of pressure used is dictated by convenience and may be as high as 1000 pounds per square inch. Whatever pressure is used, the temperature of the emulsion should be below the boiling point of water (at that pressure) and the term "hot emulsion" as used herein is intended to mean an emulsion at a temperature at which no steam will be generated at the pressure used. The efficiency of separation, on many oils, improves, the closer the temperature approaches that at which steam is generated but on some light oils an efficient separation takes place if the hot emulsion entering the separator is at a temperature of 150° F. (65° C.). In the latter case it is convenient and economical to operate at this lower temperaure.

The degree to which the oil is cooled in the separator varies with different oils. Apparently the ease with which the water leaves the oil depends in some degree on the viscosity of the oil.

By heating the oil, the viscosity is lowered and by cooling the oil, the oil is rendered more viscous. If, therefore, oil which is highly viscous at atmospheric temperatures, were cooled to atmospheric temperature, say, 70° F. (21° C.) in the tubes of the separator very little separation could thereafter be secured since the oil would be so viscous that the water would not readily separate therefrom. If, however, the oil were cooled 20° F. (11° C.) from a temperature of 210° F. (99° C.), it would emerge from the tubes of the separator into the water at a sufficiently low viscosity to permit ready separation.

It is an essential feature of my invention that the cooling step shall be a partial one, that is, that the separator shall not cool the oil to atmospheric temperatures but that the emulsion emerging from the tubes shall be "warm emulsion". By "warm emulsion" I wish to be understood as meaning an emulsion having a temperature considerably higher than atmospheric temperature, and in no case more than 30° F. (17° C.) cooler than the hot emulsion entering the separator. By the term "partially cooling the emulsion", I wish to be understood as meaning cooling the hot emulsion 30° F. (17° C.) or less below the temperature of the hot emulsion.

I claim as my invention:

1. An apparatus for separating oil from an oil and water emulsion, which comprises: means for producing hot emulsion; walls providing an outer chamber; walls providing an inner chamber adapted to receive a cooling fluid; and walls forming constricted passages extending through said inner chamber to said outer chamber, the hot emulsion being caused to pass through said constricted openings and be partially cooled and the partially cooled emulsion passing from said passages into contact with water in said outer chamber to effect a separation of the oil and water.

2. An apparatus for separating oil from an oil and water emulsion, which comprises: means for producing hot emulsion; walls providing an outer chamber; walls providing an inner chamber adapted for the reception of a cooling fluid; and emulsion circulating means extending downwardly through said inner chamber into said outer chamber whereby said emulsion is partially cooled and caused to contact with water in said outer chamber to effect a separation of the oil and water.

3. An apparatus for separating oil from an oil and water emulsion, which comprises: means for producing hot emulsion; walls forming an outer chamber; walls forming an inner chamber disposed in spaced relation to said outer chamber; means for circulating a cooling medium through said inner chamber; walls forming constricted passages extending through said inner chamber into said outer chamber whereby hot emulsion passing through said passages is caused to be partially cooled and to contact with water in said outer chamber to effect a separation of the oil and water; means for withdrawing clean oil from the upper part of said outer chamber; and means for withdrawing water from the lower part of said chamber.

4. An apparatus for separating oil from an oil and water emulsion, which comprises: means for producing hot emulsion; walls forming an outer chamber; walls forming an inner chamber extending downwardly into said outer chamber; means for circulating a cooling fluid through said inner chamber; and walls forming constricted passages leading through said inner chamber into said outer chamber for partially cooling said emulsion during its downward flow through said passages, said emulsion being deposited upon the surface of water in said outer chamber to effect a separation of the oil and water content thereof.

5. An apparatus for separating oil from an oil and water emulsion, which comprises: means for producing hot emulsion; walls forming an outer chamber; walls forming an inner chamber extending downwardly into said outer chamber; means for circulating a cooling fluid through said inner chamber; walls forming constricted passages leading through said inner chamber into said outer chamber for partially cooling said emulsion during its downward flow through said passages, said emulsion being deposited upon the surface of water in said outer chamber to effect a separation of the oil and water content thereof; and means for withdrawing oil and water from said outer chamber.

6. An apparatus for separating oil from an oil and water emulsion, which comprises: means for producing hot emulsion; a shell providing an outer chamber having a closure plate; walls forming an inner chamber supported within said outer chamber by said closure plate; means for circulating a cooling fluid through said inner chamber; walls forming restricted passages extending through said inner chamber to said outer chamber whereby hot emulsion is partially cooled in its downward passage through said passages and is forced into contact with water contained in said outer chamber to effect a separation of the oil and water of said emulsion; means for withdrawing oil from the upper part of said outer chamber; and means for withdrawing water from the lower part of said outer chamber.

WALTER C. BAILEY.